United States Patent
Moore et al.

(10) Patent No.: US 9,485,646 B2
(45) Date of Patent: Nov. 1, 2016

(54) GENERATING REQUEST MESSAGE TO OBTAIN WIRELESS SERVICES USING A MINIMAL SET OF SERVICES THAT ARE DESIGNATED BY DEFAULT FOR A ROAMING CONDITION

(75) Inventors: Tiffany A Moore, Omaha, NE (US); Karen D Hennigan, Omaha, NE (US); Mark A Montz, Elkhorn, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/396,139

(22) PCT Filed: Jul. 31, 2012

(86) PCT No.: PCT/US2012/048910
§ 371 (c)(1),
(2), (4) Date: Oct. 22, 2014

(87) PCT Pub. No.: WO2014/021829
PCT Pub. Date: Feb. 6, 2014

(65) Prior Publication Data
US 2015/0087284 A1     Mar. 26, 2015

(51) Int. Cl.
*H04W 8/04* (2009.01)
*H04W 8/12* (2009.01)
*H04W 4/00* (2009.01)
*H04W 8/18* (2009.01)
*H04W 4/12* (2009.01)
*H04W 88/06* (2009.01)
(Continued)

(52) U.S. Cl.
CPC ............... *H04W 8/04* (2013.01); *H04W 4/00* (2013.01); *H04W 4/001* (2013.01); *H04W 8/12* (2013.01); *H04W 8/18* (2013.01); *H04W 4/12* (2013.01); *H04W 4/14* (2013.01); *H04W 8/20* (2013.01); *H04W 88/06* (2013.01)

(58) Field of Classification Search
USPC ........................................................ 455/418
See application file for complete search history.

(56) References Cited

U.S. PATENT DOCUMENTS

| 7,613,454 B2 | 11/2009 | Zhang |
| 2002/0197991 A1 | 12/2002 | Anvekar et al. |

(Continued)

FOREIGN PATENT DOCUMENTS

| EP | 1347665 A1 | 9/2003 |
| EP | 2106164 A1 | 9/2009 |
| WO | WO-2012050261 A1 | 4/2014 |

OTHER PUBLICATIONS

Extended European Search Report received in EP Application No. 12882465.3, Mar. 14, 2016, 12 pages.

(Continued)

*Primary Examiner* — Kabir A Timory
(74) *Attorney, Agent, or Firm* — Mahamedi Paradice LLP (57) ABSTRACT

A roaming condition is detected on a wireless device, in which the wireless device is operational in a region where the wireless device is not permitted in have wireless services other than a designated minimal set of services. A service request message is generated on the wireless device. The service request can be structured for handing by a home region service provider that can initiate one or more wireless services for the computing device using a local service provider for the region. The service request message can be transmitted from the computing device using the designated minimal set of services.

12 Claims, 5 Drawing Sheets

(51) Int. Cl.
    *H04W 4/14*    (2009.01)
    *H04W 8/20*    (2009.01)

(56) References Cited

U.S. PATENT DOCUMENTS

| | | | |
|---|---|---|---|
| 2005/0020263 A1* | 1/2005 | Sherman | H04M 15/41 455/435.1 |
| 2005/0276229 A1 | 12/2005 | Torabi | |
| 2008/0188218 A1 | 8/2008 | Sherman et al. | |
| 2009/0282251 A1 | 11/2009 | Cook et al. | |
| 2010/0075669 A1* | 3/2010 | Sparks | H04W 8/183 455/433 |
| 2011/0217979 A1 | 9/2011 | Nas | |

OTHER PUBLICATIONS

International Preliminary Report on Patentability received in PCT Application No. PCT/US2012/048910, Feb. 12, 2015, 6 pages.
International Search Report & Written Opinion received in PCT Application No. PCT/US2012/048910, Mar. 22, 2013, 9 pages.
mobilein.com, "Unstructured Supplementary Services Data," (Web Page), Mobile in a Minute, Copyright 2001-2004, retrieved Apr. 11, 2013, 3 Pages.
Symsoft AB, "Symsoft® USSD," (Research Paper), Copyright 2012, 2 pages, http://www.symsoft.com/source.php/1459015/Symsoft_AP-APL_USSD_v1.0.pdf.

* cited by examiner

GENERATING REQUEST MESSAGE TO OBTAIN WIRELESS SERVICES USING A MINIMAL SET OF SERVICES THAT ARE DESIGNATED BY DEFAULT FOR A ROAMING CONDITION

BACKGROUND

Under conventional approaches, provisioning a subscriber to allow international roaming for cellular customers is accomplished primarily by manual processes. Often, the user is required to call or contact the carrier, either in advance or when roaming internationally, in order to enable services. From the carrier perspective, international roaming requires the carrier to establish services for the requesting customer with the international carrier. Sometimes the subscriber is not able to contact the carrier with the phone because of the service limitation, and must resort to making a call by other means to contact the operator internationally.

A Home Location Register (HLR) is an existing element in the infrastructure of wireless communication services. Wireless carriers typically employ HLRs to maintain date for registering wireless devices on a wireless network, as well as for routing calls to wireless devices. Wireless devices register with the HLR, and the HLR determines the location (e.g., by serving Mobile Switching Center (MSC)) of the wireless device when, for example, the wireless device joins a wireless network.

DETAILED DESCRIPTION

Embodiments described herein enable a wireless device to generate and send a service request for wireless services using one of the network messaging service that are enabled by carriers and wireless service providers on a limited basis by default. Among other benefits, examples of embodiments described herein enable a roaming international user to establish wireless services while roaming internationally, using an application or service provided through the user's wireless device. As a result, many of the steps that the user would have, under conventional approaches, taken to enable international roaming can be simplified or even automated. Moreover, the user is able to request the wireless services using a messaging service that is highly secure and resource efficient.

In examples described herein, a roaming condition is detected on a wireless device, in which the wireless device is operational in a region where the wireless device is not permitted, by default, to have wireless services other than a designated minimal set of services. A service request message is generated on the wireless device. The service request can be structured for handling by a home region service provider that can initiate one or more wireless services for the computing device using a local service provider for the region. The service request message can be transmitted from the computing device using the designated minimal set of services.

In some examples, a mobile application can be installed on a wireless device in order to enable functionality that includes generation of a service request message.

Still further, another example provides for a wireless device that includes memory resources, one or more processors, and a wireless communication sub-system. The one or more processors respond to an international roaming condition in which wireless services are disabled for a local carrier, by generating a service request message for a home carrier using a network messaging service. The service request message specifies one or more wireless services that are requested to be enabled for the wireless device while the wireless device is roaming internationally. The service request message is transmitted through the wireless communication sub-system, so that the service request message is transmitted to the home carrier through a local carrier.

In some variations, a computer system is provided for providing carrier services. The computer system includes a memory resource, a telephony network interface, and one or more processors. The processors process an incoming service request message from a wireless device that is roaming internationally. In processing the request, the one of more processors may determine an identifier for the wireless device, as well as one or more wireless services that are being requested in the service request message. A user account that is associated with the wireless device is accessed in order to approve or disapprove each of the one or more wireless services that are being requested. A response is communicated to a local carrier where the wireless device is roaring, to enable the one or more wireless services on the wireless device, if the one or more wireless services are approved for international roaming by the wireless device.

Figure 1:
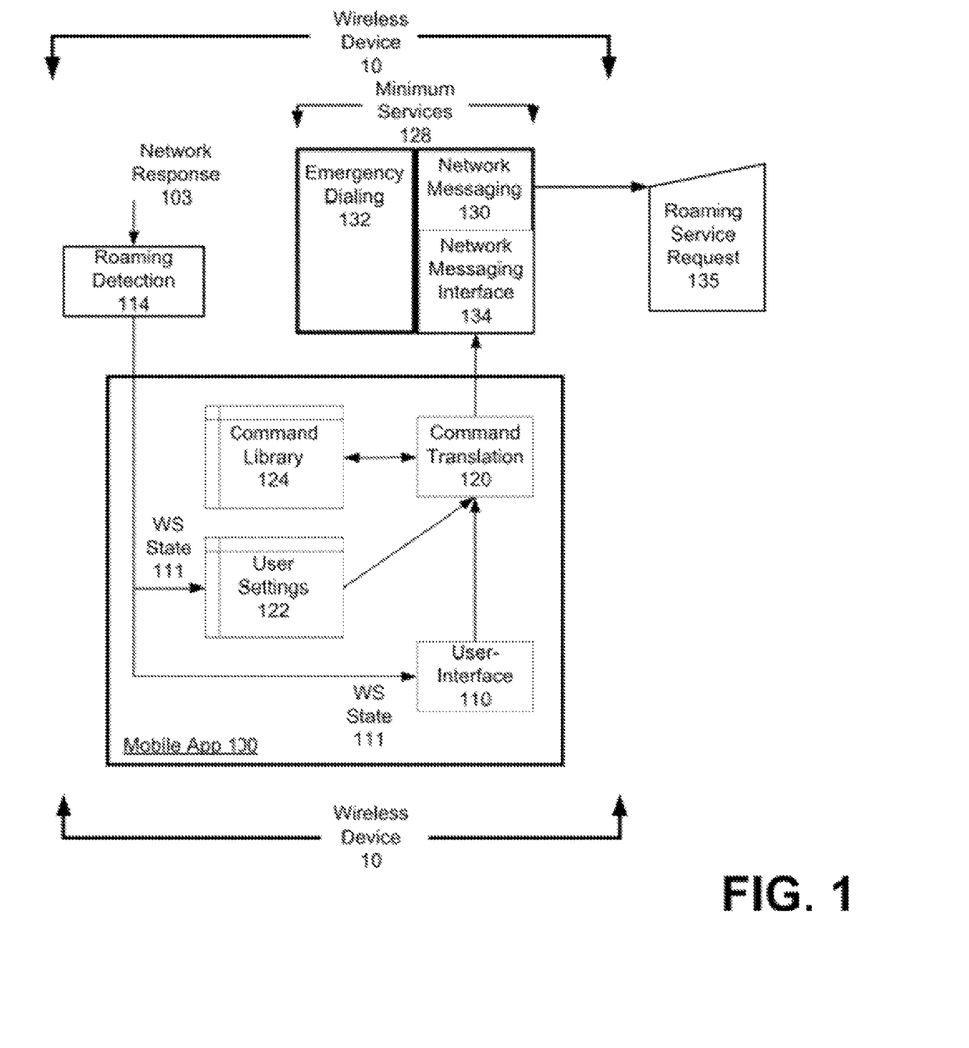
FIG. 1 illustrates an example wireless device that is enabled to generate a service request message using a minimal set of services that are provided by default when a roaming condition is present.

FIG. 1 illustrates an example wireless device that is enabled to generate a service request message using a minimal set of services that are provided by default when a roaming condition is present. In some implementations, a roaming condition corresponds to the wireless device being in a region where its service provider (e.g., wireless carrier) is not a provider, or does not provide service by default. As an example, the wireless device 10 may experience the roaming condition when it is transported from its home country (e.g., United States) to an international domain (e.g., Spain). In such roaming conditions, wireless devices by default have available to them a designated set of minimum services. This minimum service set can vary from jurisdiction and provider, but can sometimes include emergency dialing, and information dialing. Furthermore, some embodiments described herein recognize that the minimal service set in almost all foreign jurisdictions generally includes a limited network messaging service, such as provided by Unstructured Supplementary Service Data (USSD) messaging under the Global System for Messaging (GSM) standards. The designated minimal services generally exclude wireless services that the user can actually use, such as voice calling, or Short Service Messaging (SMS).

Under conventional approaches, a user of a wireless device has to perform several manual steps in order to acquire international roaming abilities for a wireless device. Typically, the user has to contact his or her carrier in advance, and establish the international roaming ability before the service is enabled in a designated international region. In contrast to conventional approaches, an example of FIG. 1 enables benefits that include automating many of the steps that the user takes in establishing wireless services when roaming internationally.

In an example of FIG. 1, wireless device 10 includes a mobile application 100 that can be operated to establish wireless services (above the designated minimal set) when roaming conditions would otherwise preclude wireless services. In an example of FIG. 1, the mobile application 100 is installed on the wireless device 10. For example, the mobile application 100 can be downloaded onto the wireless device. In variations, the application 100 can reside with and be operated from, for example, a Universal Subscriber Identification Module (USIM), which can be inserted into the wireless device 10 to enable carrier services.

In one implementation, the mobile application 100 receives a wireless service state input 111 from resources of the wireless device 10 that can detect roaming condition. For example, a roaming detection resource 114 on the wireless device 10 can detect when the wireless device has no service because of roaming conditions. For example, the roaming detection resource 114 can receive a no service signal 103 from a service provider in a foreign region.

In an example of FIG. 1, the mobile application 100 can provide components that include a user interface component 110 and a command translation 120. The mobile application 100 can process a wireless state input 111 from the roaming detection resource 114. The wireless state input 111 can trigger the mobile application 100 into determining that wireless services are disabled as a result of the existing of roaming conditions.

In one implementation, the mobile application 100 can launch automatically in response to receiving the wireless service state input 111 indicating a disabled roaming wireless service state. For example, the mobile application 100 can be implemented to automatically generate a user-interface 121 using the user-interface component 110. The user-interface component 110 can enable the user to select what wireless services the user wishes to obtain in the particular region. For example, the user can specify that he wishes voice calling, roaming voice calling (in the foreign region), SMS/MMS messaging, mapping services, etc. The user input 119 can be received by the user-interface component 110 and processed by the command translation component 120. In particular, the command translation component 120 can access a command library 124 that translates the user input 119 into network service codes 125 that can be communicated using a network messaging service 130 of the wireless device.

The wireless device 10 can be equipped to carry a minimum set of wireless services 128 that include a network messaging service 130. In many, if not all jurisdictions, the minimal service set includes network messaging 130. As another example, some (but not all) jurisdictions enable emergency dialing 132 as part of the minimum service set for a particular jurisdiction. The network messaging service 130 can be present as inherent functionality of the wireless device, or as part of the wireless standard utilized by the wireless device 10 and/or international carriers. For example, under the GSM standard, the network messaging service can be provided by USSD messaging. USSD messaging (as well as other forms of network messaging) however, is numeric and region specific. Similarly, under cellular networks that operate using the ANSI network, the network messaging service can be provided using Feature Request (FeatReq) messaging. Among other benefits, such network messaging services are highly secure, and generally beyond the reach of hacking techniques such as spoofing.

The command library 124 can translate a user's intent for desired wireless services to the codes that can be communicated under the network messaging protocol in use on the device.

In a variation to receiving user input, the mobile application 100 can be configured to respond automatically to the wireless service state 111 indicating the roaming condition. A user setting data store 122 can be used to determine user default preferences as so services that the user will want when the roaming conditions are present. For example, the user can pre-specify services that the user will want when roaming conditions preclude the user's wireless services. Setting input 127 can specify wireless services such as voice, SMS etc., and the setting input 127 can be translated by the command translation component 120 (using command library 124) into network service codes 125.

The messaging application 100 can communicate the network service codes 125 to a network messaging interface 134 of the network messaging service 130. The network messaging service 130 can be provided as inherent or resident functionality on the wireless device 10. In variations, some or all of the network messaging interface 134 can be provided as part of the mobile application 100.

The network messaging service 130 can generate a roaming service request message 125 that is communicated from the device and handled by the wireless network in the roaming region. As described with other examples, the roaming service request message 135 can be handled by a home carrier for the wireless device. The home carrier can respond to the roaming service request message 135 by communicating with the provider of the roaming region and enabling requested wireless services for the wireless device 10 in the roaming region.

Figure 2:
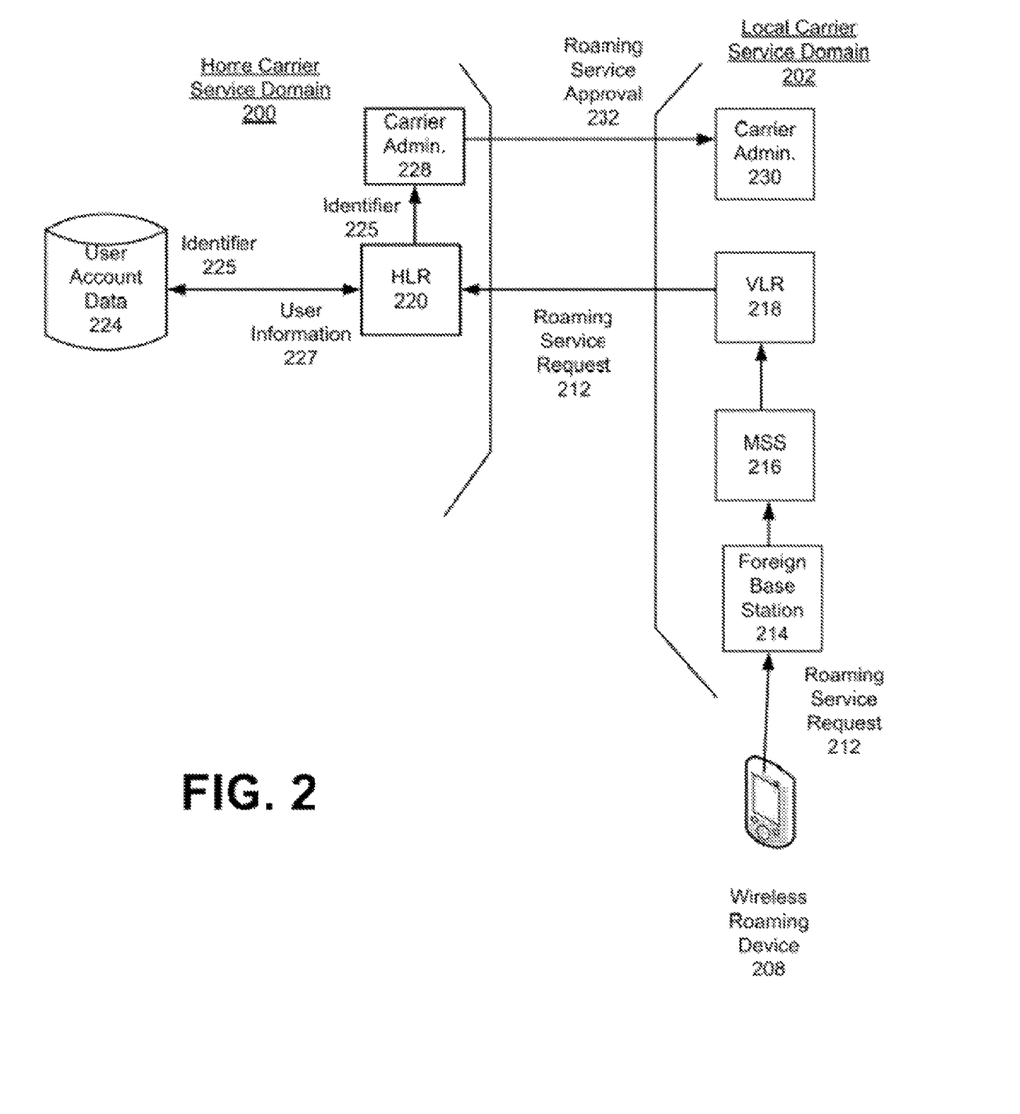
FIG. 2 illustrates an example system for handling a roaming service request message generated from a wireless device in a roaming region.

FIG. 2 illustrates an example system for handling a roaming service request message generated from a wireless device in a roaming region. In FIG. 2, wireless device 208 may be present in a region that is deemed roaming, soon as an international territory as compared to the home region of the wireless device 208. The wireless device 208 can be configured to generate a roaming service request message 212. As described with an example of FIG. 1, the roaming service request message 212 corresponds to a network service message that can be generated using a designated minimal service set for the wireless device 208 when the wireless device experiences the roaming condition. Thus, for example, the wireless device 208 can be equipped with an application that can enable generation of the service request message 212. For example, the service request message 212 can be generated for GSM service using USSD format.

In a typical wireless infrastructure, the roaming service request message 212 can be handled, in the roaming region, by nodes of a local carrier service domain 202. The local carrier service domain 202 can include a local (and foreign) base station 214, a mobile switching station 216, and a visitor location register 218. Each of the nodes in the roaming region can process the roaming service request message 212 by forwarding the message on. The roaming service request message 212 can be communicated from the roaming region to the home location register (HLR) 220.

The roaming service request message 212 can identify the wireless device (or user of the wireless device), as well as the codes representing the services that the user is requesting. The roaming service request message 212 can also include header information, for example, that identifies the roaming region of the wireless device 208.

The HLR 220 can reference the identifier 225 provided by the roaming service request message 212 to a user account data store 224. The user account data store 224 can provide user information 227 such as whether the user for whom the message was generated is entitled to receive, for example, international roaming services, or services in the particular roaming region. The user information 227 can be used to enable the roaming services for the wireless service 208 in the roaming region. The HLR 220 can communicate, for example, the identifier 225 to the carrier administrator services 228, which can establish billing rates for the user's international roaming services. The carrier administration services 228 can have established agreement with carriers servicing other regions (e.g., wireless carriers or service providers for other countries). The carrier administration services 228 can signal roaming service approval 232 to the local carrier 230 and arrange, for example, billing arrangements where the home service bills the user and compensates the local carrier where the roaming occurred.

Methodology

Figure 3A:
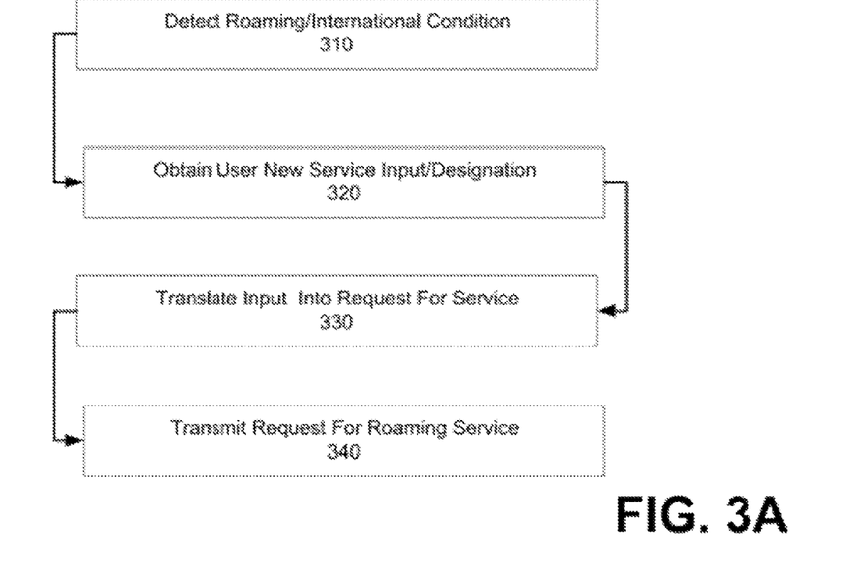
FIG. 3A illustrates an example method for a wireless device to transmit a roaming service request message.

FIG. 3A illustrates an example method for a wireless device to transmit a roaming service request message. A method such as described by FIG. 3A can be implemented using, for example, a wireless device 10 such as described with an embodiment of FIG. 1. Accordingly, reference may be made to elements described with an example of FIG. 1 for purpose of illustrating suitable elements or components for performing a step or sub-step being described.

The wireless device 10 can detect a roaming or condition (310) in which services are not available to the wireless device in the region where the wireless device is located (e.g., such as when the device roams internationally). For example, resources on the wireless device 10 can detect, for example, a network response 103 that denies service to one or more wireless services of the wireless device. The detection of the roaming condition can coincide with the device losing its ability to conduct basic services, such as voice telephony or SMS messaging.

The wireless device 10 can then obtain the user's preference or selection for services in the region (320). In one implementation, the user's preference for roaming services, as an example, are stored. When the roaming condition is detected, the mobile application 100 automatically retrieves the preference. For example, the mobile application 100 can retrieve a preference for wireless services in response to an international roaming condition. In a variation, when the international roaming condition is detected, the user may be prompted with a user interface that causes the user to enter some input that includes selection of desired wireless services.

The user's preference or selection can be converted into a coded command for communication using a network messaging protocol (330). For example, the user's preference or selection can be translated into codes that are communicated using USSD. The message can be directed to, for example, the HLR 220 for the user's home wireless service.

The message with the coded command can then be communicated as part of the designated minimal services that are available to the device in the international roaming condition (340). The message can then be communicated from the foreign region to the home carrier's service point (e.g., see HLR 220 in FIG. 2) using the network messaging protocol.

Figure 3B:
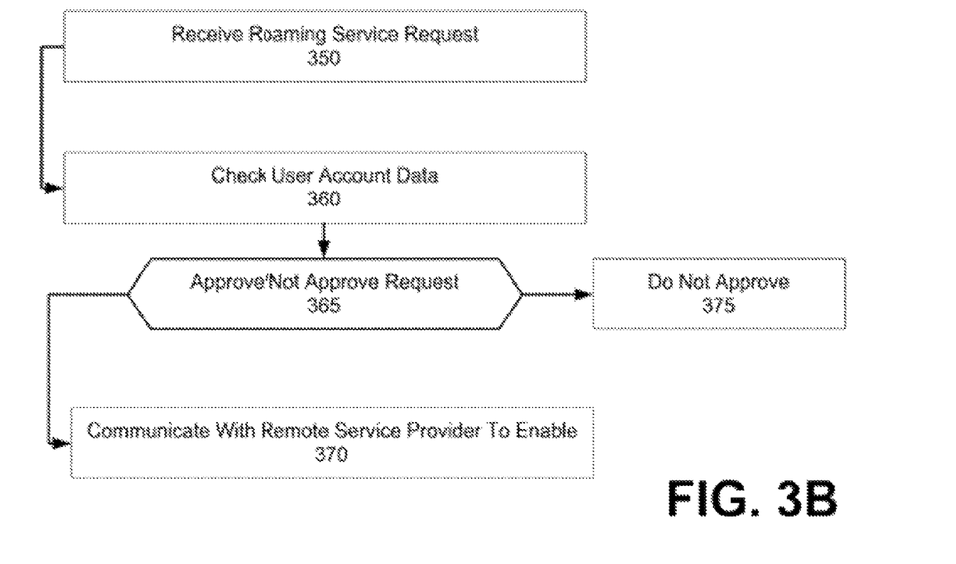
FIG. 3B illustrates an example method for a home wireless carrier to process a roaming service request message.

FIG. 3B illustrates an example method for a home wireless carrier to process a roaming service request message. A method such as described by FIG. 3B can be performed using a wireless carrier's infrastructure components, such as the HLR 220 (see FIG. 2) and carrier administrative services 228 (see FIG. 2). Accordingly, reference may be made to elements of FIG. 2 for purpose of illustrating suitable elements or components for performing a step or sub-step being described.

The home carrier may receive a roaming service request message from a wireless device 204 (350). As described with examples of FIG. 1 and FIG. 2, the service request message can be generated from a wireless device 204 that is roaming in a region where service is not provided by default for that device (e.g., internationally). The home carrier may process the service request message at, for example, an HLR.

The home carrier can use information included in the message to identify the user or wireless device, and to check the account associated with the user or device in order to determine whether international roaming services are permitted for the account (360). For example, the HLR 220 can check carrier administrative services 228 to determine whether the user account provides for the ability to receive services when located at a present location. For example, the determination can be made as to whether the wireless device 10 is approved for receiving wireless services when roaming internationally.

Based on, for example, user account settings, a determination can be made as to whether the roaming service request message should be approved or not approved (365). Approval may also be based on the location of the user when the request is made. For example, the user may be approved for services in some international regions, but not others. Another condition for approval can be that the user has an established resource available for making payment. For example, the user can establish with their carrier a balance that can be applied to international roaming. In implementation, the user can fund the account at any time using, for example, a credit card. For example, the user can fund a balance or account for international roaming using a credit card or online payment service. In this way, the user would be able to fund the balance or account and enable roaming even when the user is situated in another country or region where the user is not able to receive service from his or her carrier.

If the permission is not provided, one implementation provides for no further action to be taken (375). Thus, the user receives no services in response to the request. In variations, the HLR 220 (or other home carrier element) sends a reply message using the network messaging protocol (e.g., USSD) to the device to inform the device that wireless services will not be enabled.

If the international roaming services are approved, the HLR 220 (or other home carrier element) sends a communication to the carrier or carriers of the international region that communicates approval for the user to receive service in that region (370). The communication from the home carrier can be based on pre-existing agreements and infrastructure to enable such communications to be exchanged and processed for users. Thus, for example, the user can be billed for international roaming, and portions of the proceeds for international roaming by the user can be shared by the home carrier with the international carrier.

Wireless Device

Figure 4:
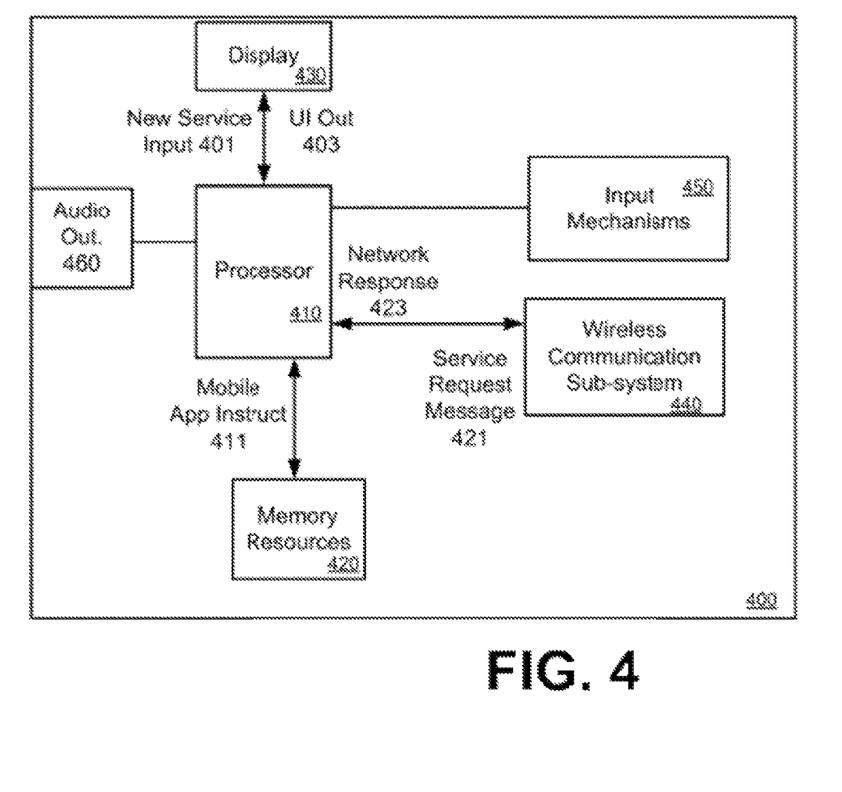
FIG. 4 illustrates an example hardware diagram for a wireless device upon which embodiments described herein may be implemented.

FIG. 4 illustrates an example hardware diagram for a wireless device upon which embodiments described herein may be implemented. For example, in the context of FIG. 1, the mobile application can be installed and operated on a device such as described by FIG. 4. The wireless device 400 can correspond to a cellular device that is capable of telephony, messaging, and data services. In variations, the wireless device 400 can correspond to a device that uses cellular data channels without voice. The wireless device 400 includes a processor 410, memory resources 420, a display device 430, one or more communication sub-systems 440, and an input mechanism 450. The communication sub-system 440 can include resources (e.g., wireless chipset or radio) to communicate on wireless network, such as those that utilize the GSM network. The memory resources 420 can be structured or otherwise provided an organization layer corresponding to, for example, data and instructions used for the mobile application 100.

The memory resources 420 can store instructions representing the mobile application 100. The processor 410 can be enabled to execute the instructions so as to enable operations described with use of the mobile application 100, or with operation of the wireless device in the context described with FIG. 1, FIG. 2A or FIG. 3. For example, the instructions 411 stored in the memory resources 420 and executed by the processor 410 can be used to perform operations for (i) generating a user interface output 403 that is rendered on the display, (ii) optionally processing input 401 received through user interaction with the display 430 or other input mechanism 450, in response to the user interface output 403, (iii) generating the service request message 421, including translating the user's input command into codes that are structured in accordance with the network messaging protocol (e.g., USSD), and (iv) communicating the service request message 421 for reception by the home carrier. The processor 410 can also detect international roaming conditions based on, for example, a network response 423, received through the communication sub-system 440.

Home Server

Figure 5:
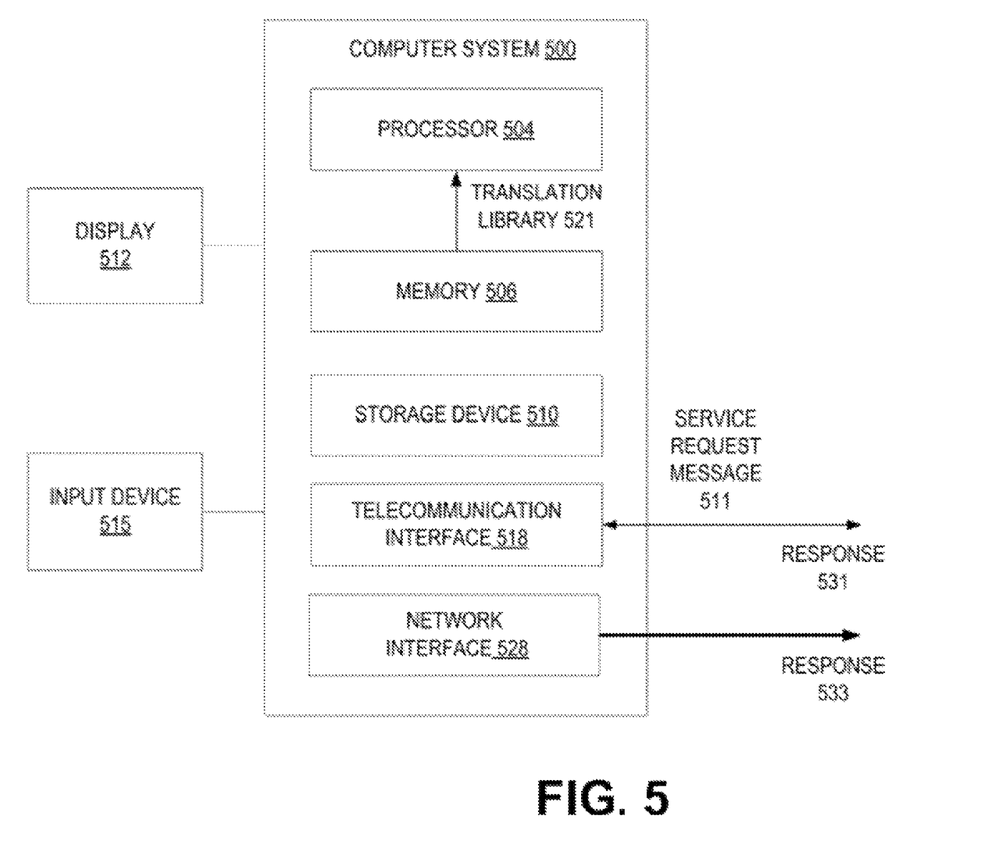
FIG. 5 illustrates an example computer system 500 for processing a service request message from a wireless device that is roaming internationally.

FIG. 5 illustrates an example computer system 500 for processing a service request message from a wireless device that is roaming internationally. For example, a computer system 500 can be used to implement HLR 220 as described with FIG. 2. The computer system 500 includes at least one processor 504 for processing instructions. Computer system 500 also includes a memory 506, such as a random access memory (RAM) or other dynamic storage device, for storing information and instructions to be executed by processor 504. The memory 506 can include a persistent storage device, such as a magnetic disk or optical disk. The memory 506 can also include read-only-memory (ROM).

A telecommunication interface 518 enables the computer system 500 to communicate with individual wireless devices using, for example, a wireless GSM network or Public Switch Telephony Network (PSTN). Additionally, a network interface 528 enables the server 500 to communicate with other services, such as administrative services or with servers of other service providers.

The computer system 500 is operable to implement functionality that includes translating a service request message 511 received over the telecommunication interface 518, from a wireless device that is roaming internationally. The computer system 500 can, for example, store and use a translation library 521 to translate codes contained in the service request message 511 in order to generate one or more response 531, 533. The functions that can be performed fey the computer system 500 include those such as described by an example of FIG. 3B. The computer system 500 can store and use instructions for implementing operations described with an example of FIG. 3B. These functions include processing the service request message 511, and generating the response 531 to the service request message 511. The response 523 can be communicated to, for example, another computer system operated by the same provider (e.g., carrier administrative services), or by another provider (e.g., carrier in the remote region where the wireless device is present). The response 523 can also include a return message, communicated in the network messaging protocol (e.g., USSD) and communicated to the wireless device using the telephony network interface 518.

In an example of FIG. 5, the processor 504 executes one or more sequences of instructions stored in memory 506. Such instructions may be read into memory 506 from another machine-readable medium, such as a storage device. Execution of the sequences of instructions contained in main memory 506 causes processor 504 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A non-transitory computer-readable medium that stores instructions for enabling wireless services on a computing device, wherein the instructions, when executed by one or more processors, cause the one or more processors to perform operations comprising:

detecting a roaming condition in which the computing device is operational in a region where the computing device is not permitted, by default, to have wireless services other than a designated minimal set of services;

enabling a user to specify a wireless service via generation of a user interface;

generating, on the computing device, a service request message, the service request message comprising an identifier for the wireless service and being structured for handling by a home region service provider that can initiate the wireless service for the computing device using a local service provider for the region; and causing transmission of the service request message from the computing device using the designated minimal set of services.

2. The non-transitory computer-readable medium of claim 1, wherein the instructions for detecting the roaming condition includes detecting that the computing device is being operated in a region that is deemed foreign to the home service provider.

3. The non-transitory computer-readable medium of claim 1, wherein the instructions for detecting the roaming condition include instructions for automatically detecting the roaming condition.

4. The non-transitory computer-readable medium of claim 1, wherein the instructions for detecting the roaming condition include instructions for detecting the roaming condition in response to a user input.

5. The non-transitory computer-readable medium of claim 1, wherein the instructions for enabling the user to specify the one or more services are provided as an application for the computing device.

6. The non-transitory computer-readable medium of claim 1, wherein the one or more services include one or more services selected from a group of services that include voice calling, data service, Short Message Service (SMS), or Multimedia Messaging Service (MMS).

7. The non-transitory computer-readable medium of claim 1, further comprising instructions for configuring the one or more services using data settings provided by a user.

8. A wireless device comprising:
a memory to store a set of instructions;
a wireless communication sub-system;
one or more processors that use instructions stored in memory to:
respond to an international roaming condition in which wireless services are disabled for a local carrier, by enabling a user to specify a wireless service via generation of a user interface and generating a service request message for a home carrier using a network messaging service, the service request message comprising an identifier for the wireless service,
wherein the service request message specifies the wireless service to be enabled for the wireless device while the wireless device is roaming internationally; and
cause transmission of the service request message through the wireless communication sub-system, so that the service request message is transmitted to the home carrier through the local carrier.

9. The wireless device of claim 8, wherein the one or more processors include code that represents a plurality of specific wireless services that are being requested for the wireless device, the plurality of specific wireless services comprising the wireless service.

10. The wireless device of claim 8, wherein the one or more processors cause transmission of the service request message to be performed automatically in response to detecting the international roaming conditions in which wireless services are disabled.

11. The wireless device of claim 8, wherein the one or more processors generate the user interface to enable the user to select what wireless services are to be requested.

12. The wireless device of claim 8, wherein the service request message is communicated using an Unstructured Supplementary Service Data (USSD) format.

* * * * *